US012667948B2

(12) United States Patent
Pedicini

(10) Patent No.: US 12,667,948 B2
(45) Date of Patent: Jun. 30, 2026

(54) FASTENER DRIVING APPARATUS

(71) Applicant: Tricord Solutions, Inc., Brentwood, TN (US)

(72) Inventor: Christopher Pedicini, Brentwood, TN (US)

(73) Assignee: TRICORD SOLUTIONS, INC., Brentwood, TN (US)

( * ) Notice: Subject to any disclaimer, the term of this patent is extended or adjusted under 35 U.S.C. 154(b) by 0 days.

(21) Appl. No.: 18/632,616

(22) Filed: Apr. 11, 2024

(65) Prior Publication Data

US 2025/0262734 A1 Aug. 21, 2025

Related U.S. Application Data

(60) Provisional application No. 63/554,517, filed on Feb. 16, 2024.

(51) Int. Cl.
*B25C 1/04* (2006.01)
*B25C 1/06* (2006.01)

(52) U.S. Cl.
CPC .............. *B25C 1/047* (2013.01); *B25C 1/041* (2013.01); *B25C 1/06* (2013.01)

(58) Field of Classification Search
CPC ............ B25C 1/041; B25C 1/047; B25C 1/06
USPC .......................................................... 227/130
See application file for complete search history.

(56) References Cited

U.S. PATENT DOCUMENTS 3,056,137 A * 10/1962 Wandel ..................... B25C 5/16 227/127
3,774,293 A * 11/1973 Golsch .................... B25C 1/008 227/66
4,544,090 A * 10/1985 Warman .................... B25C 1/06 227/134
4,867,016 A * 9/1989 Di Edwardo ......... B25B 13/481 81/57.3
5,566,924 A * 10/1996 Shirk ...................... E01B 29/26 254/18
8,011,547 B2 * 9/2011 Leimbach ............... B25C 1/041 227/129
9,539,714 B1 * 1/2017 Pedicini .................... B25C 1/06
10,946,504 B1 * 3/2021 Pedicini .................. B25C 1/047

(Continued)

FOREIGN PATENT DOCUMENTS

CN 2406776 Y * 11/2000
CN 212020643 U * 11/2020
CN 117697694 A * 3/2024 ............. B25C 1/047

*Primary Examiner* — Joshua G Kotis
(74) *Attorney, Agent, or Firm* — XSENSUS LLP

(57) ABSTRACT

A fastener driving apparatus includes a gas spring piston, a first drive shaft, a second drive shaft, a drive mechanism operatively coupled to the first drive shaft and the second drive shaft, an actuator fixedly coupled to the drive mechanism, and an anvil moveable between a first position and a second position. During an operational cycle of the fastener driving apparatus, the first drive shaft and the second drive shaft may drive the drive mechanism causing the actuator to engage to the anvil when the anvil is at the first position, to move the anvil from the first position to the second position and compress the gas spring piston to generate potential energy, and to disengage from the anvil when the anvil is at the second position causing the gas spring piston to release the potential energy and accelerate the anvil to drive a fastener.

10 Claims, 6 Drawing Sheets

(56) References Cited

U.S. PATENT DOCUMENTS

| | | | | |
|---|---|---|---|---|
| 2005/0218181 | A1* | 10/2005 | Gross | B25C 1/06 173/210 |
| 2008/0006672 | A1* | 1/2008 | Tanimoto | B25C 1/06 227/132 |
| 2008/0210736 | A1* | 9/2008 | Blessing | B25C 1/06 227/132 |
| 2009/0090762 | A1* | 4/2009 | Leimbach | B25C 1/06 227/136 |
| 2016/0096259 | A1* | 4/2016 | Pedicini | B25C 1/047 227/146 |
| 2017/0100829 | A1* | 4/2017 | Pedicini | B25C 1/047 |
| 2017/0274513 | A1* | 9/2017 | Pedicini | B25C 1/003 |
| 2017/0355069 | A1* | 12/2017 | Scott | B25C 1/041 |
| 2017/0361444 | A1* | 12/2017 | Namouz | B25C 1/047 |
| 2019/0224825 | A1* | 7/2019 | Pedicini | B25C 1/06 |
| 2020/0061788 | A1* | 2/2020 | Pedicini | B25C 1/047 |
| 2020/0156227 | A1* | 5/2020 | Namouz | B25C 1/047 |
| 2020/0171640 | A1* | 6/2020 | Pedicini | B25C 1/047 |
| 2020/0338708 | A1* | 10/2020 | Po | B25C 1/047 |
| 2021/0078149 | A1* | 3/2021 | Pedicini | B25C 1/047 |
| 2023/0398670 | A1* | 12/2023 | Liu | B25C 1/041 |

* cited by examiner

FASTENER DRIVING APPARATUS

CROSS-REFERENCE TO RELATED APPLICATION

This application claims the benefit of U.S. Provisional Application No. 63/554,517, filed Feb. 16, 2024, which is incorporated herein by reference in its entirety.

BACKGROUND

Electromechanical fastener driving apparatuses (also referred to herein as a "driver," "gun" or "device") known in the art often weigh generally less than 15 pounds and may be configured for an entirely portable operation. Contractors and homeowners commonly use power-assisted devices for driving fasteners into wood. These power-assisted devices for driving fasteners can be in the form of finishing fastener systems used in baseboards or crown molding in house and household projects, or in the form of common fastener systems that are used to make walls or hang sheathing onto same, for example. These systems can be portable (i.e., not connected or tethered to an air compressor or wall outlet) or non-portable.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

Some implementations described herein relate to a fastener driving apparatus, comprising: a gas spring assembly including a cylinder, a rod, and a rod seal, the cylinder defining a pressurized chamber and a rod port that leads to the pressurized chamber, the rod extending from within the pressurized chamber through the rod port and out of the pressurized chamber, the rod seal sealing the rod port, the rod seal being stationary, and the rod being linearly movable through the rod port; a flexible linkage drive assembly including a set of rotary motion transfer elements, a flexible linkage that is mechanically coupled to the set of rotary motion transfer elements, and an actuator that is mechanically coupled to the flexible linkage element, the set of rotary motion transfer elements being rotatable about an axis in a plane that is normal to the axis; and an anvil that is moveable between a first position and a second position; wherein, during an operational cycle of the fastener driving apparatus, the set of rotary motion transfer elements drive the flexible linkage element causing the actuator to: engage to the anvil when the anvil is at the first position, move the anvil from the first position to the second position causing the anvil to contact the rod and move the rod to an energized position generating potential energy, and disengage from the anvil when the anvil is at the second position causing the rod to release at least a portion of the potential energy and accelerate the anvil to drive a fastener.

Some implementations described herein relate to a driving apparatus, comprising: a gas spring assembly including a cylinder, a rod, and a rod seal, the cylinder defining a pressurized chamber and a rod port that leads to the pressurized chamber, the rod extending from within the pressurized chamber through the rod port and out of the pressurized chamber, the rod seal sealing the rod port, the rod seal being stationary, and the rod being linearly movable through the rod port; a drive assembly including a first drive shaft, a second drive shaft, a drive mechanism that is operatively coupled to the first drive shaft and the second drive shaft, and an actuator that is fixedly coupled to the drive mechanism; and an anvil that is moveable between a first position and a second position, wherein, during an operational cycle of the fastener driving apparatus, the first drive shaft and the second drive shaft drive the drive mechanism causing the actuator to: engage to the anvil when the anvil is at the first position, move the anvil from the first position to the second position causing the anvil to contact the rod and move the rod to an energized position generating potential energy, and disengage from the anvil when the anvil is at the second position causing the rod to release at least a portion of the potential energy and accelerate the anvil to drive a fastener.

Some implementations described herein relate to a method of operating a fastener driving apparatus, the fastener driving apparatus including a gas spring piston, a flexible linkage drive assembly, an actuator mechanically coupled to the flexible linkage drive assembly, and an anvil that is moveable between a first position and a second position, the method comprising: causing, by driving the flexible linkage drive assembly, the actuator to engage to the anvil at the first position and move the anvil from the first position to the second position, wherein the anvil, when moving from the first position to the second position, contacts the gas spring piston causing the gas spring piston to compress and generate potential energy; and causing, by driving the flexible linkage drive assembly, the actuator to disengage from the anvil when the anvil is at the second position, wherein, after the actuator is disengaged from the anvil when the anvil is at the second position, the gas spring piston releases the potential energy to accelerate the anvil to drive a fastener.

DETAILED DESCRIPTION OF EXAMPLE EMBODIMENTS

Figure 1A:
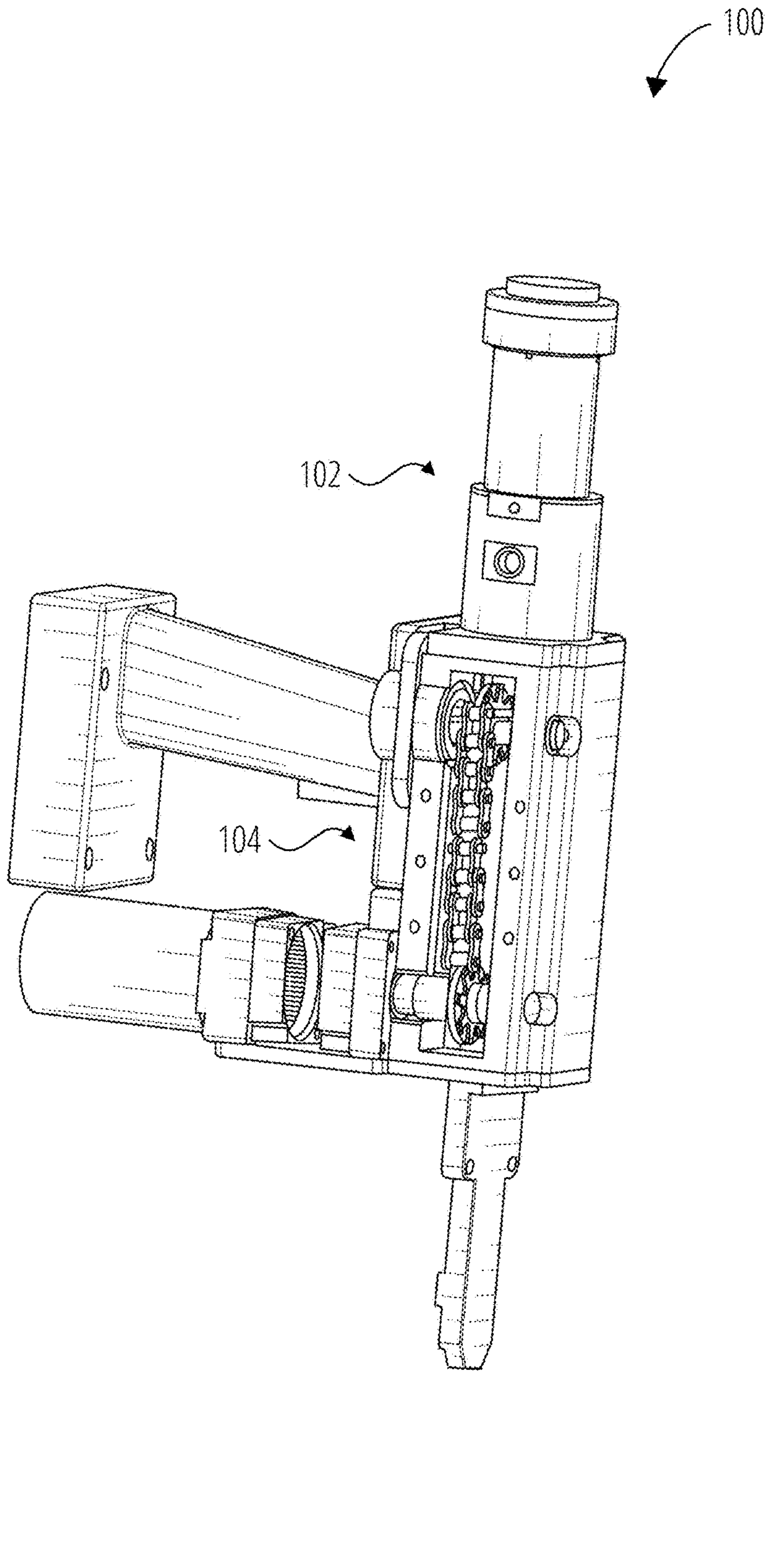
FIG. 1A is a diagram of an example fastener driving apparatus including an integrated flexible linkage element as a lifter according to one or more aspects of the disclosed subject matter.

The following detailed description of example implementations refers to the accompanying drawings. The same reference numbers in different drawings may identify the same or similar elements.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Typical electromechanical fastener driving devices suffer from various disadvantages. For example, typical electromechanical fastener driving devices can have complex, expensive, and unreliable designs. As an example, typical electromechanical fastener driving devices use fuel powered mechanisms, which require consumable fuels and are expensive. As another example, typical electromechanical fastener driving devices have rotating flywheel designs that are complicated coupling or clutching mechanisms based on frictional means, which increases costs associated with the electromechanical fastener driving apparatuses.

Another disadvantage of currently available electromechanical fastener driving devices includes poor ergonomics. For example, the fuel powered mechanisms have loud combustion reports and combustion fumes, while multiple impact devices are fatiguing and are noisy. Additionally, non-portability of the electromechanical fastener driving devices can be an issue. For example, traditional electromechanical fastener driving devices are tethered to a fixed compressor and thus must maintain a separate supply line.

Other disadvantages of currently available electromechanical fastener driving devices include high reaction force, short life, safety issues, and return mechanisms. Regarding the high reaction force and short life, mechanical spring driven mechanisms have high tool reaction forces because of their long fastener drive times. Additionally, the springs are not rated for types of duty cycles used by the currently available electromechanical fastener driving devices, leading to premature failure. Furthermore, consumers are unhappy with their inability to seat longer fasteners or work with denser wood species. Regarding safety issues, "air spring" and heavy spring driven designs suffer from safety issues, particularly for longer fasteners since a predisposition of an anvil is towards the substrate. During jam clearing, this can cause the anvil to strike a hand of the operator.

Regarding the return mechanisms in currently available electromechanical fastener driving devices, the return mechanisms involve taking some of the drive energy (e.g., away from a drive stroke). For example, either there is a bungee or spring return of the driving anvil assembly or there is a vacuum or air pressure spring formed during the movement of the anvil. All of these mechanisms take energy away from the drive stroke and decrease efficiency.

Furthermore, in typical electromechanical fastener driving devices, gas spring assemblies and anvils (and/or anvil assemblies) are integrally formed pairs. Accordingly, replacing one or other requires simultaneous replacement of both the gas spring assemblies and the anvils (and/or the anvil assemblies), resulting in increased costs associated with typical electromechanical fastener driving devices.

Additionally, in typical electromechanical fastener driving devices, an insufficient distance between a gas spring piston and a sidewall of a gas spring cylinder causes throttling of an air flow past the gas spring piston during a driving stroke. This results in the gas spring piston and the anvil (and/or anvil assembly) being speed limited leading to poor performance. In light of these various disadvantages, there exists the need for a fastener driving device that overcomes these various disadvantages by improving efficiency and safety, for example, as further described herein.

FIGS. 1A-1E are diagrams of an example fastener driving apparatus 100 according to one or more aspects of the disclosed subject matter. Generally, the fastener driving apparatus 100 may use an integrated flexible linkage element (e.g., a flexible linkage element included in a flexible linkage drive assembly, such as a chain included in a chain drive assembly or a belt included in a belt drive assembly, among other examples) as a lifter (e.g., a lift assembly), which reduces costs associated with the fastener driving apparatus 100. Additionally, the inventors unexpectedly discovered a need to use a pre-stretched flexible linkage element and/or flexible linkage element tensioning to avoid slapping of the flexible linkage element when tension of the flexible linkage element suddenly changes as the flexible linkage element releases to allow for the fastener driving apparatus 100 to a fastener, as described in more detail elsewhere herein.

Furthermore it was inadvertently uncovered during testing related to the fastener driving apparatus 100 that allowing a gas spring piston of the fastener driving apparatus 100 (e.g., used to provide potential energy) to float or otherwise be unconstrained in a plane perpendicular to motion of the anvil (e.g., used to drive the fastener based on being accelerated by a release of the potential energy) eliminates side loading and wear on the gas spring piston. A further unexpected result was this allows for independent replacement of the gas spring piston and/or the anvil, and/or components associated with the gas spring piston and/or the anvil, which is beneficial as the gas spring piston and the anvil wear at different rates.

Additionally, or alternatively, the flexible linkage drive assembly includes a one-way element that allows the flexible linkage element to move only in one direction (e.g., the one-way element prevents the flexible linkage element from being back driven). In some implementations, the fastener driving apparatus 100 uses a one-way element (e.g., a one-way bearing) on an upper (or top) rotary motion transfer element (e.g., an upper sprocket or an upper pulley, among other examples) for the flexible linkage drive assembly. This allows for short latency between a trigger pull and driving a fastener as components of the flexible linkage drive assembly (e.g., the lift assembly) only move a fraction of a rotation to release the potential energy and drive the fastener.

By locating the one-way element in the upper rotary motion transfer element, the flexible linkage element of the flexible linkage drive assembly is prevented from being stretched (e.g., from being under tension) which greatly reduces flexible linkage element slap (e.g., when the flexible linkage element transitions from a tension state to a non-tension state). Using the one-way element enables the upper rotary motion transfer element to receive an associated load (e.g., rather than the flexible linkage element receiving the load). Additionally, or alternatively, a flexible linkage element tensioner (e.g., shown as a flexible linkage element tensioner 124*a* in FIG. 1B) may be used so the flexible linkage element does not fully relieve (e.g., when transitioning from the tension state to the non-tension state). In some implementations, the flexible linkage element and the one-way element may restrain a driving force acting on the anvil during at least one point in an operational cycle of the fastener driving apparatus, as described in more detail elsewhere herein.

As shown in FIGS. 1A-1E, the fastener driving apparatus 100 includes a gas spring assembly 102, a flexible linkage drive assembly 104 (e.g., a chain drive assembly), an anvil 106, and a sensor 108. The gas spring assembly 102 includes a cylinder 110, a rod 112, and a rod seal 114. The cylinder 110 defines a pressurized chamber 116 and a rod port 118 that leads to the pressurized chamber 116. The pressurized chamber 116 may be pressurized via a pressurized media, such as pressurized nitrogen. The rod 112 extends from within the pressurized chamber 116 through the rod port 118 and out of the pressurized chamber 116. The rod seal 114 seals the rod port 118. The rod seal 114 is stationary, and the rod 112 is linearly movable through the rod port 118 (e.g., the rod seal 114 acts on the rod 112 as the rod 112 linearly moves through the rod port 118). The rod seal 114 prevents the pressurized media from leaving the pressurized chamber 116 and prevents contaminants from entering the pressurized chamber 116.

Figure 1B:
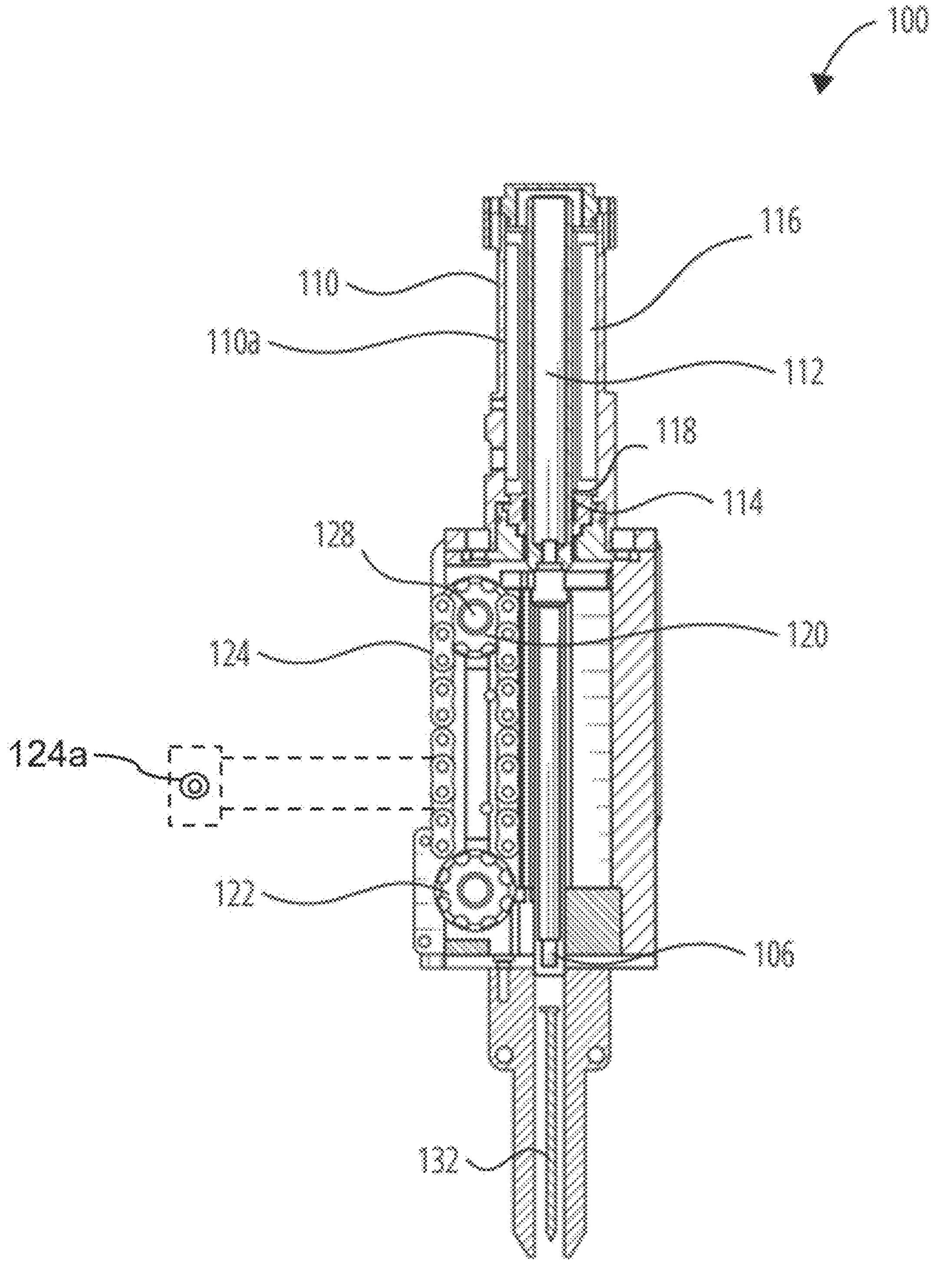
FIG. 1B is a diagrammatic cross-section of the fastener driving apparatus of FIG. 1A according to one or more aspects of the disclosed subject matter.
Figure 1C:
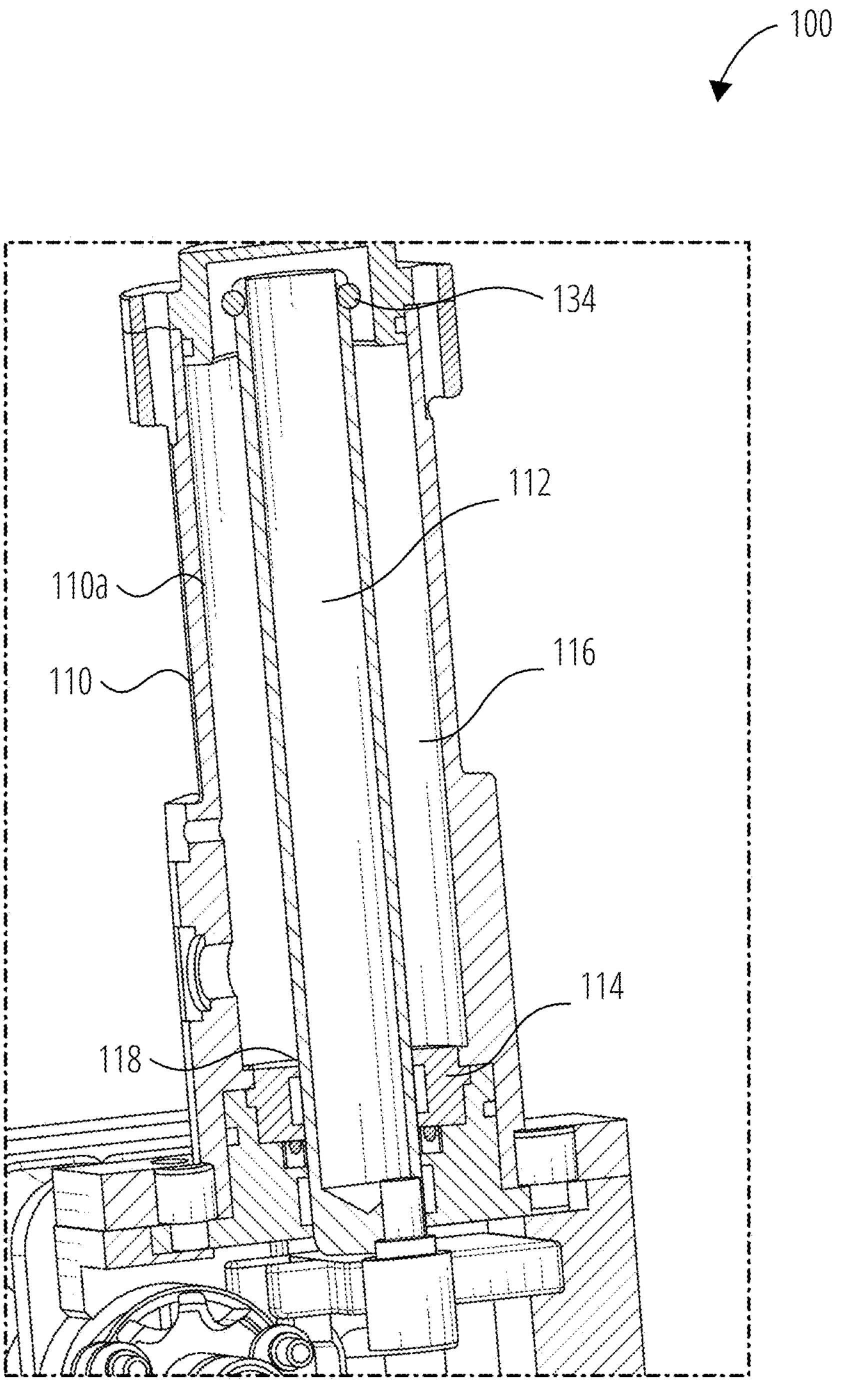
FIG. 1C is a diagrammatic cross-section of the fastener driving apparatus of FIG. 1A including a seal and a piston according to one or more aspects of the disclosed subject matter.
Figure 1D:
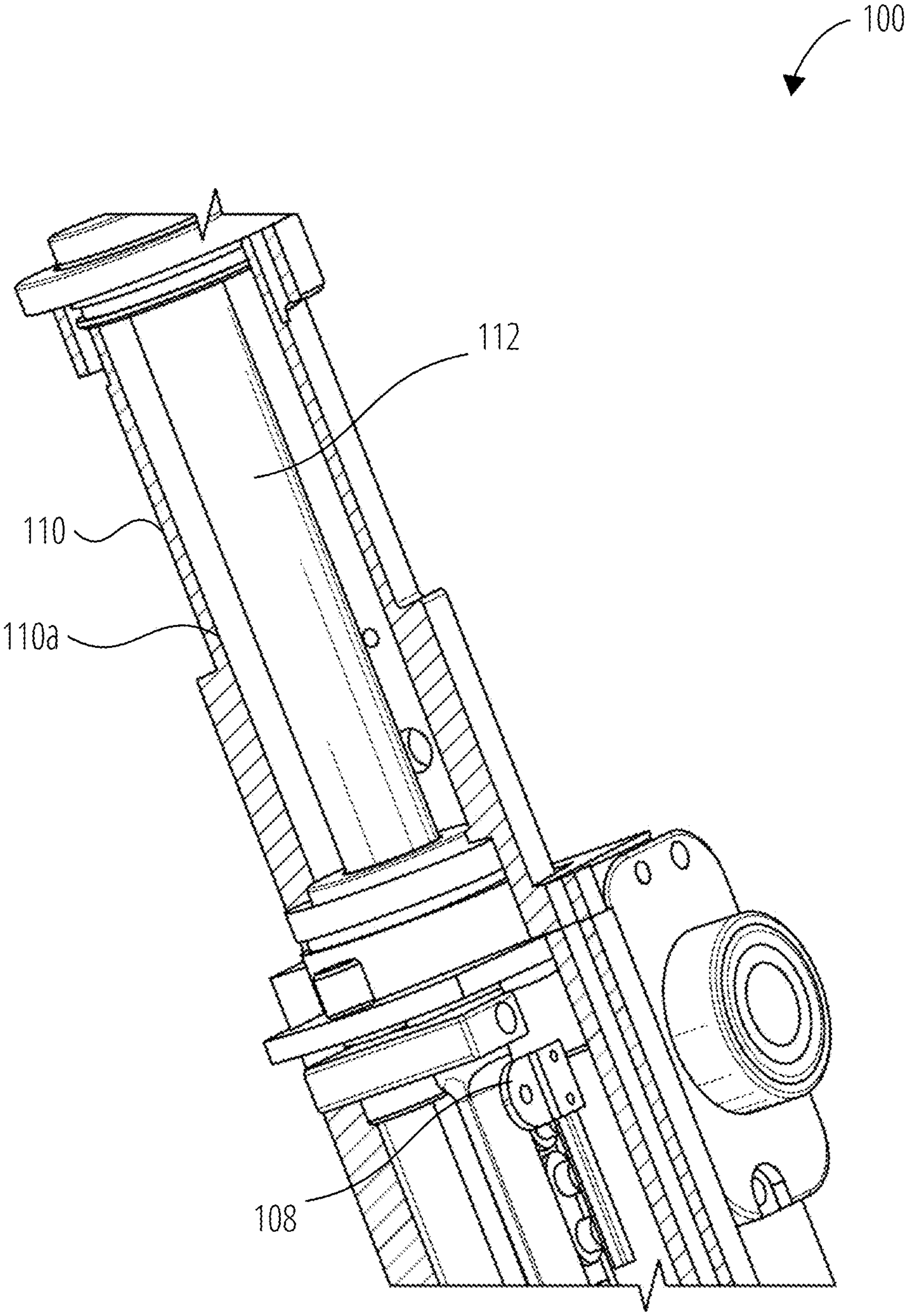
FIG. 1D is a diagrammatic cross-section of the fastener driving apparatus of FIG. 1A including a gas spring assembly, a fastener drive assembly, a clutch, and a sensor according to one or more aspects of the disclosed subject matter.
Figure 1E:
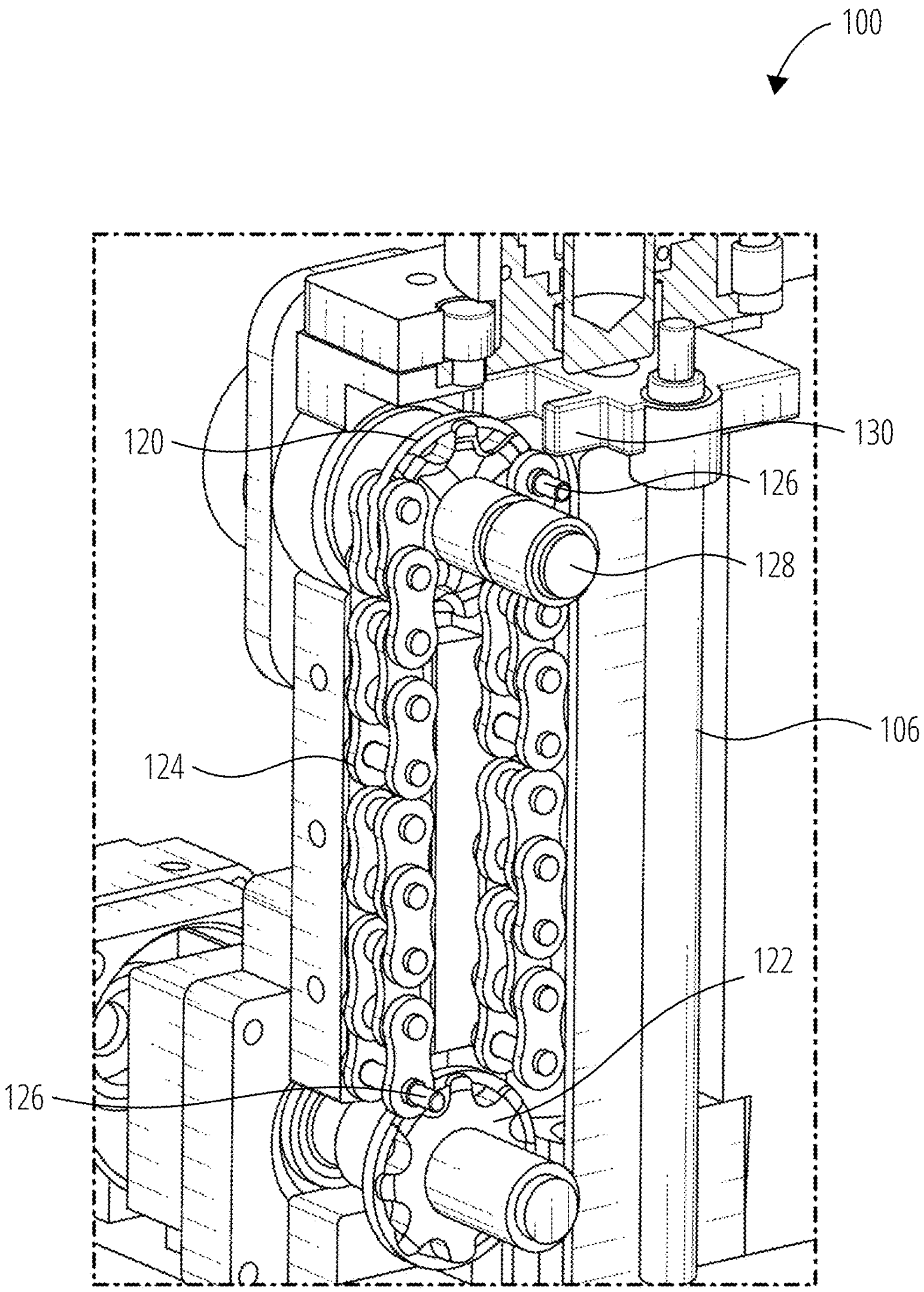
FIG. 1E is a diagrammatic cross-section of the fastener driving apparatus of FIG. 1A according to one or more aspects of the disclosed subject matter.

The flexible linkage drive assembly 104 includes a set of rotary motion transfer elements (e.g., shown as a first sprocket 120 (or upper sprocket 120) and a second sprocket 122 (or lower sprocket 122) in FIGS. 1A, 1B, and 1E), a flexible linkage element 124 (e.g., shown as a chain in FIGS. 1A-1B, and 1E) that is mechanically coupled to the set of rotary motion transfer elements, and an actuator (e.g., shown as a lifting pins 126 in FIG. 1E) that is mechanically coupled to the flexible linkage element 124. The set of rotary motion transfer elements may be rotatable about an axis in a plane that is normal to the axis. Accordingly, the set of rotary motion transfer elements may be driven (e.g., via a motor operatively connected to a power source) to drive the flexible linkage element 124 along the plane (e.g., through a 360-degree duty cycle). Although the set of rotary motion transfer elements are shown and described as a first sprocket 120 and a second sprocket 122 in connection with FIGS. 1A-1E, the set of rotary motion transfer elements may be any suitable rotary motion transfer elements, such as pulleys included in a belt drive assembly, among other examples).

In some implementations, the anvil 106 may be moveable between a first position and a second position. The first sprocket 120 may be positioned proximate the first position of the anvil 106 and the second sprocket 122 may be positioned near the second position of the anvil 106. As shown in FIG. 1D, the second sprocket 122 includes a one-way element 128 (e.g., a one-way bearing). In some implementations, the one-way element 128 maintains the lifting pin 126 in a position, which may be referred to herein as a ready position, which maintains the anvil 106 in the second position. The one-way element 128 may maintain the anvil 106 in the second position for a time period (e.g., any suitable time period), as described in more detail elsewhere herein.

Accordingly, in some implementations, the second sprocket 122, acting as a drive sprocket to drive the first sprocket 120 and the flexible linkage element 124, may be operatively connected to the one-way element 128. By operatively connecting the one-way element 128 to the second sprocket 122, the second sprocket 122 receives a load related to the flexible linkage element 124 transitioning from a tension state to a non-tension state (e.g., the second sprocket 122 receives a load related to the actuator disengaging from the anvil 106 when the anvil 106 is in the second position, as described in more detail elsewhere herein). This prevents the flexible linkage element 124 from remaining under constant tension and stretching, which can lead to flexible linkage element slap when the flexible linkage element 124 transitions from the tension state to the non-tension state.

In some implementations, the anvil 106 may be operatively coupled to an engaging region 130 (e.g., to form an anvil assembly). The engaging region 130 may be used to move the anvil 106 from the first position to the second position, as described in more detail elsewhere herein. As an example, during the operational cycle of the fastener driving apparatus 100, the set of rotary motion transfer elements may drive the flexible linkage element 124 causing the actuator to engage to the engaging region 130 when the anvil 106 is located at the first position (e.g., after driving a fastener, which is shown as a fastener 132 in FIG. 1B).

After engaging to the engaging region 130, the actuator may cause the anvil 106 to move from the first position to the second position. During movement of the anvil 106 from the first position to the second position, the anvil 106 (or a portion of the anvil 106 or anvil assembly) may contact the rod 112 and move the rod 112 to an energized position (e.g., generating potential energy). As an example, movement of the anvil 106 from the first position to the second position may cause the rod 112 to move linearly into the pressurized chamber 116, which generates the potential energy (e.g., by compressing the pressurized media). In other words, during the operational cycle of the fastener driving apparatus 100, the anvil 106 couples to, and moves, the rod 112 causing the rod 112 to generate the potential energy.

After the anvil 106 reaches the second position, the set of rotary motion transfer elements may drive the flexible linkage element 124 causing the actuator to disengage from the anvil 106. After the actuator is disengaged from the anvil 106 (e.g., when the anvil 106 is at the second position), the rod 112 releases at least a portion of the potential energy and accelerates the anvil 106 to drive the fastener 132 (e.g., during a fastener driving stroke, or a down stroke).

In some implementations, the flexible linkage element 124 and the one-way element 128 may re-engage to the anvil 106 during at least one point in the operational cycle of the fastener driving apparatus 100 to restrain the anvil 106 from being accelerated (e.g., by the rod 112). In other words, the flexible linkage element 124 and the one-way element 128 may re-engage to the anvil 106 to restrain (or relieve) a driving force acting on the anvil 106. As an example, if the fastener 132 becomes jammed during the down stroke, the flexible linkage element 124 and the one-way element 128 may recouple to the anvil 106 (e.g., via the first lifting pin or the second lifting pin) and restrain the anvil 106 from accelerating (e.g., because the one-way element 128 prevents the flexible linkage element 124 from being back driven). This allows for safe clearing of the jam (e.g., because the driving force acting on the anvil 106 is relieved during a jam event).

In some implementations, there is sufficient distance between the rod 112 and a sidewall of the cylinder (e.g., shown as an inner sidewall 110*a* in FIG. 1B) such that a flow of air flowing past the rod 112 (e.g., at speeds of 1000 inches per second, among other examples) during the fastener driving stroke is not throttled. In other words, the rod 112 may be spaced a distance (e.g., a clearance) from a sidewall (e.g., the inner sidewall 110*a*) of the cylinder 110 that prevents the flow of air past the rod 112 during the fastener driving stroke from being throttled. In this way, the rod 112 and the anvil 106 (and/or the anvil assembly) are not speed limited during the fastener driving stroke leading to increased performance compared to typical electromechanical fastener driving apparatuses.

In some implementations, the fastener driving apparatus 100 includes a bumper having a thickness. A maximum fastener driving stroke may be greater than a fastener stroke of the fastener by at least approximately 20% of the thickness of the bumper (e.g., a maximum fastener driving stroke may be greater than a fastener stroke of the fastener by at least approximately 20% of the thickness of the bumper). During dry fires, it was unexpectedly discovered that the rod 112 (e.g., a rod head of the rod, as shown as a rod head 134 of the rod 112 in FIG. 1C) hit an end of the cylinder 110 causing failure (e.g., by an impact of the rod 112 and the cylinder 110). Thus, a distance between the rod head 134 and an end of the cylinder 110 is such that the rod 112 does not impact any portion of the cylinder 110 (e.g., the stroke of the rod 112 prevents the rod 112 from impacting any portion of the cylinder 110).

In some implementations, the actuator may include a first actuator (e.g., a first lifting pin) and a second actuator (e.g., a second lifting pin) that are each mechanically coupled to the flexible linkage element 124. As an example, the first actuator may be mechanically coupled to the flexible linkage element 124 at a first actuator position and the second actuator may be mechanically coupled to the flexible linkage element 124 at a second actuator position.

In some implementations, the first actuator position and the second actuator position may be 180 degrees out of phase with one another (e.g., based on a 360-degree duty cycle of the flexible linkage element 124, or one revolution of the flexible linkage element 124). In this way, during a 360-degree duty cycle of the flexible linkage element 124, the fastener driving apparatus 100 may drive two fasteners (e.g., based on the first actuator and the second actuator engaging to, and disengaging from, the anvil 106).

For example, the set of rotary motion transfer elements may drive the flexible linkage element 124 causing the first actuator to engage to the anvil 106 when the anvil 106 is at the first position. After engaging to the anvil 106, the first actuator may cause the anvil 106 to move from the first position to the second position. During movement of the anvil 106 from the first position to the second position, the anvil 106 may contact the rod 112 and move the rod 112 to the energized position (e.g., generating a first potential energy). After the anvil 106 reaches the second position, the set of rotary motion transfer elements may drive the flexible linkage element 124 causing the first actuator to disengage from the anvil 106. After the first actuator is disengaged from the anvil 106 (e.g., when the anvil 106 is at the second position), the rod 112 releases at least a portion of the first potential energy and accelerates the anvil 106 to drive the fastener 132 (e.g., a first fastener).

After the anvil 106 drives the fastener 132, the set of rotary motion transfer elements may drive the flexible linkage element 124 causing the second actuator to engage to the anvil 106 when the anvil 106 is at the first position (e.g., after driving the fastener 132, the anvil 106 is at the first position). After engaging to the anvil 106, the second actuator may cause the anvil 106 to move from the first position to the second position. During movement of the anvil 106 from the first position to the second position, the anvil 106 may contact the rod 112 and move the rod 112 to the energized position (e.g., generating a second potential energy). After the anvil 106 reaches the second position, the set of rotary motion transfer elements may drive the flexible linkage element 124 causing the second actuator to disengage from the anvil 106. After the second actuator is disengaged from the anvil 106 (e.g., when the anvil 106 is at the second position), the rod 112 releases at least a portion of the second potential energy and accelerates the anvil 106 to drive another fastener (e.g., a second fastener).

In some implementations, the sensor 108 may detect that the anvil 106 is in the second position. In this way, the sensor 108 may send (e.g., to a controller of the fastener driving apparatus 100) an input indicating that the anvil 106 is in the second position and ready for actuation. Additionally, or alternatively, the rod 112 may include a hollow portion (e.g., a side of the rod 112 may be hollowed out), which lightens and reduces a reactionary force associated with driving the fastener 132.

Furthermore, in an unexpected discovery, it was found that one or more components of the gas spring assembly 102 wear at different rates than one or more components of the anvil 106 and/or the anvil assembly. Accordingly, in some implementations, the gas spring assembly 102 and the anvil 106 (and/or the anvil assembly) are not physically attached to one another via a threaded connection or a welded connection, among other examples. This allows independent freedom of movement in a plane that is perpendicular to a connection (or contact point) between the gas spring assembly 102 and the anvil 106 (and/or the anvil assembly).

As an example, as shown in FIG. 1B, there is independent freedom of movement in an x-y plane that is perpendicular to a connection (or contact point) between the gas spring assembly 102 and the anvil 106 along a z-axis (or fastener drive axis). In this way, the gas spring assembly 102 and the anvil 106 (and/or the anvil assembly may be separately replaced (e.g., rather than simultaneously being replaced), resulting in reduced costs and repair advantages for extending a life of the fastener driving apparatus 100 compared to typical electromechanical fastener driving apparatuses (e.g., which require simultaneous replacement of gas spring assemblies and anvils (and/or anvil assemblies) integrally formed as pairs). Additionally, the independent freedom of movement eliminates side loading and wear on one or more components of the gas spring assembly 102.

Although the fastener driving apparatus 100 is described as using the flexible linkage drive assembly 104, the fastener driving apparatus 100 may use any suitable drive assembly. For example, the fastener driving apparatus 100 may use a drive assembly including a first drive shaft (e.g., which drives a first rotary motion transfer element), a second drive shaft (e.g., which drives a second rotary motion transfer element), a drive mechanism (e.g., a belt) that is operatively coupled to the first drive shaft and the second drive shaft, and an actuator (e.g., a lifting mechanism) that is fixedly coupled to the drive mechanism.

The first drive shaft and the second drive shaft may drive the drive mechanism causing the actuator to engage to the anvil 106 when the anvil 106 is at the first position, to move the anvil 106 from the first position to the second position causing the anvil 106 to contact the rod 112 and move the rod 112 to an energized position generating potential energy, and to disengage from the anvil 106 when the anvil 106 is at the second position causing the rod 112 to release at least a portion of the potential energy and accelerate the anvil 106 to drive a fastener.

Figure 2:
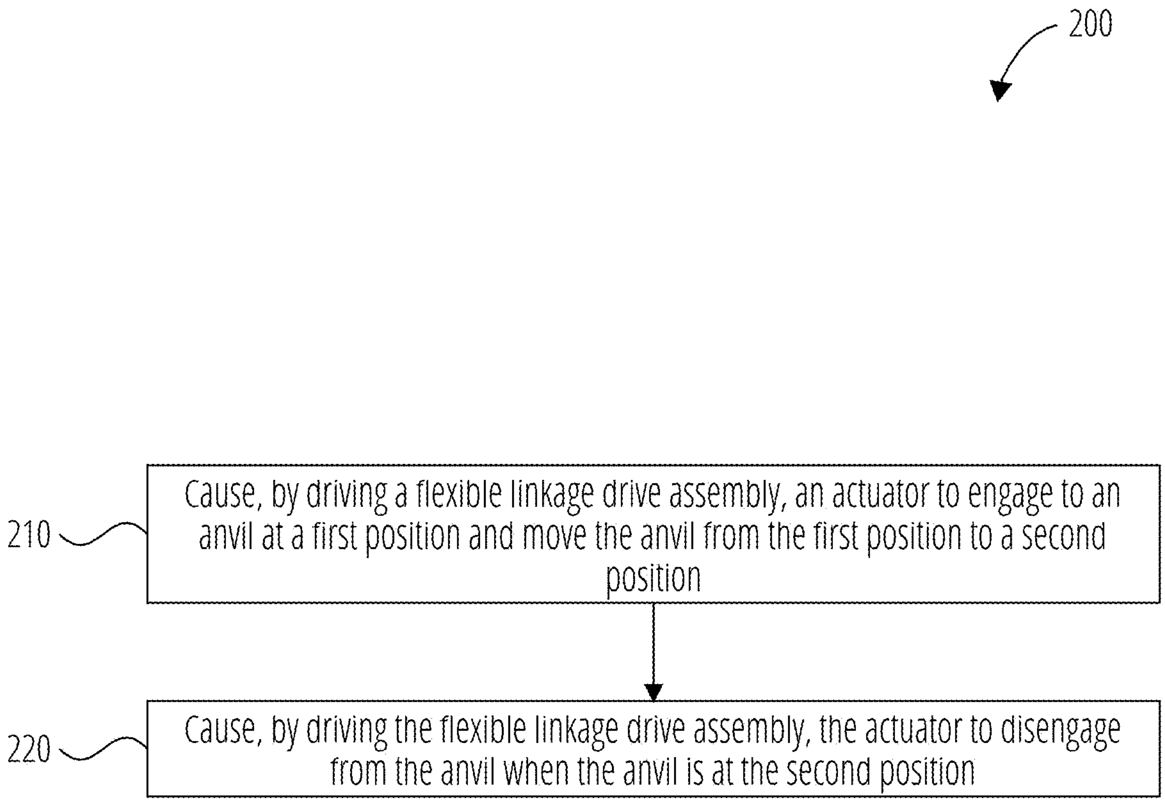
FIG. 2 is a flowchart of an example process associated with operating a fastener driving apparatus according to one or more aspects of the disclosed subject matter.

FIG. 2 is a flowchart of an example process 200 associated with operating a fastener driving apparatus. As shown in FIG. 2, process 200 may include causing, by driving the flexible linkage drive assembly 104, the actuator to engage to the anvil 106 at the first position and move the anvil 106 from the first position to the second position (block 210), as described in more detail elsewhere herein. The anvil 106, when moving from the first position to the second position, contacts the gas spring piston (e.g., the rod 112) causing the gas spring piston (e.g., the rod 112) to compress the pressurized media and generate potential energy.

As shown in FIG. 2, the process 200 includes causing, by driving the flexible linkage drive assembly 104, the actuator to disengage from the anvil 106 when the anvil 106 is at the second position (block 220), as described in more detail elsewhere herein. After the actuator is disengaged from the anvil 106 when the anvil 106 is at the second position, the gas spring piston (e.g., the rod 112) releases the potential energy to accelerate the anvil 106 to drive a fastener.

In some implementations, the process 200 further includes determining, by the sensor 108, that the anvil 106 is at the second position. In some implementations, the actuator is a first actuator and the fastener driving apparatus 100 includes a second actuator mechanically coupled to the flexible linkage drive assembly 104. After the gas spring piston (e.g., via the rod 112) releases the potential energy to accelerate the anvil 106 to drive the fastener, the process 200 may include causing, by driving the flexible linkage drive assembly 104, the second actuator to engage to the anvil 106 at the first position and move the anvil 106 from the first position to the second position. The anvil 106, when moving from the first position to the second position, contacts the gas spring piston (e.g., the rod 112) causing the gas spring piston (e.g., the rod 112) to compress the pressurized media and generate a second potential energy. The process 200 may further include causing, by driving the flexible linkage drive assembly 104, the second actuator to disengage from the anvil 106 when the anvil 106 is at the second position. After the second actuator is disengaged from the anvil 106 when the anvil 106 is at the second position, the gas spring piston (e.g., the rod 112) releases the second potential energy to accelerate the anvil 106 to drive another fastener.

In some implementations, the process 200 may include maintaining, by a tensioning device, a tension of the flexible linkage drive assembly 104. In this way, the flexible linkage element 124 does not fully relieve (e.g., when transitioning from the tension state to the non-tension state).

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel. The process 200 is an example of one process that may be performed by one or more devices described herein. These one or more devices may perform one or more other processes based on operations described herein, such as the operations described in connection with FIGS. 1A-1E. Moreover, while the process 200 has been described in relation to the devices and components of the preceding figures, the process 200 can be performed using alternative, additional, or fewer devices and/or components. Thus, the process 200 is not limited to being performed with the example devices, components, hardware, and software explicitly enumerated in the preceding figures.

Accordingly, the fastener driving apparatus 100 may use an integrated flexible linkage element (or flexible linkage drive assembly 104) as a lifter, which reduces costs associated with the fastener driving apparatus 100. Additionally, the inventors unexpectedly discovered a need to use a pre-stretched flexible linkage element to avoid slapping of the flexible linkage element when it is suddenly released to allow for the fastener drive. Furthermore, separation of a gas spring piston (e.g., of the gas spring assembly 102) from the anvil (e.g., the anvil 106) used to drive a fastener based on being accelerated by a release of the potential energy eliminates side loading and wear on the gas spring assembly 102 and allows for independent replacement of the one or more components of the gas spring assembly 102 and/or the anvil 106 (and/or one or more components of the anvil 106). Additionally, the fastener driving apparatus 100 uses the one-way element 128 on an upper rotary motion transfer element (e.g., the second sprocket 122) for the flexible linkage drive assembly 104 to prevent the flexible linkage element 124 of the flexible linkage drive assembly 104 from being stretched (e.g., from being under tension) leading to flexible linkage element slap (e.g., when the flexible linkage transitions from a tension state to a non-tension state). Using the one-way element 128 enables the upper rotary motion transfer element (e.g., the second sprocket 122) to receive an associated load (e.g., rather than the flexible linkage element 124 receiving the load). Additionally, a flexible linkage element tensioner (e.g., the flexible linkage element tensioner 124*a*) may be used so the flexible linkage element 124 does not fully relieve (e.g., when transitioning from the tension state to the non-tension state).

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

What is claimed is:

1. A fastener driving apparatus, comprising:

a gas spring assembly including a cylinder, a rod, and a rod seal, the cylinder defining a pressurized chamber and a rod port that leads to the pressurized chamber, the rod extending from within the pressurized chamber through the rod port and out of the pressurized chamber, the rod seal sealing the rod port, the rod seal being stationary, and the rod being linearly movable through the rod port;

a flexible linkage drive assembly including a set of rotary motion transfer elements, a flexible linkage element that is mechanically coupled to the set of rotary motion transfer elements, and an actuator that is mechanically coupled to the flexible linkage element, the set of rotary motion transfer elements being rotatable about an axis in a plane that is normal to the axis; and an anvil assembly comprising an anvil and an engaging region, wherein the anvil is coupled to the engaging region and is offset from an axis of the gas spring rod, wherein the anvil is moveable between a first position and a second position;

wherein the gas spring rod and the anvil assembly are not physically attached;

wherein, during an operational cycle of the fastener driving apparatus, the set of rotary motion transfer elements drive the flexible linkage element causing the actuator to:

engage the engaging region of the anvil assembly when the anvil is at the first position, move the anvil from the first position to the second position causing the anvil assembly to contact the rod and move the rod to an energized position generating potential energy, and disengage from the anvil assembly when the anvil is at the second position causing the rod to release at least a portion of the potential energy and accelerate the anvil to drive a fastener.

2. The fastener driving apparatus of claim 1, wherein the actuator is a first actuator, wherein the potential energy is a first potential energy, wherein the flexible linkage drive assembly includes a second actuator that is mechanically coupled to the flexible linkage element, and wherein, during the operational cycle and after the first actuator disengages from the anvil assembly when the anvil is at the second position causing the rod to release the at least the portion of the first potential energy and accelerate the anvil to drive the fastener, the set of rotary motion transfer elements drive the flexible linkage element causing the second actuator to:

engage to the anvil assembly when the anvil is at the first position, move the anvil from the first position to the second position causing the anvil assembly to contact the rod and move the rod to the energized position generating a second potential energy, and disengage from the anvil assembly when the anvil is at the second position causing the rod to release at least a portion of the second potential energy and accelerate the anvil to drive another fastener.

3. The fastener driving apparatus of claim 1, further comprising:

a sensor to detect a position of the anvil.

4. The fastener driving apparatus of claim 1, wherein the rod includes a hollow portion.

5. The fastener driving apparatus of claim 1, wherein the flexible linkage drive assembly includes a one-way element that allows the flexible linkage element to move only in one direction.

6. The fastener driving apparatus of claim 5, wherein the one-way element maintains the anvil at the second position for a time period before the actuator disengages from the anvil assembly.

7. The fastener driving apparatus of claim 1, wherein the pressurized chamber includes an inner sidewall, and wherein the rod is spaced a distance from the inner sidewall such that an air flow flowing past the rod as the rod accelerates the anvil is not throttled.

8. The fastener driving apparatus of claim 1, wherein the flexible linkage drive assembly includes a one-way element that prevents the flexible linkage element from being back driven, and wherein, during at least one point in the operational cycle, the flexible linkage element and the one-way element re-engage to the anvil assembly to restrain the anvil from being accelerated.

9. The fastener driving apparatus of claim 1, further comprising:

a flexible linkage element tensioner that maintains a tension of the flexible linkage element.

10. The fastener driving apparatus of claim 1, wherein the flexible linkage element is a pre-stretched flexible linkage element.

* * * * *